US006667861B2

(12) United States Patent
Gill (10) Patent No.: US 6,667,861 B2
(45) Date of Patent: Dec. 23, 2003

(54) DUAL/DIFFERENTIAL GMR HEAD WITH A SINGLE AFM LAYER (75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 09/906,659

(22) Filed: Jul. 16, 2001

(65) Prior Publication Data

US 2003/0011939 A1 Jan. 16, 2003

(51) Int. Cl.[7] .................................................. G11B 5/33
(52) U.S. Cl. .................................................. 360/324.11
(58) Field of Search ........................... 360/314, 324.11, 360/324.12

(56) References Cited

U.S. PATENT DOCUMENTS

| 5,408,377 A | * | 4/1995 | Gurney et al. ............... 360/325 |
| 5,576,915 A |   | 11/1996 | Akiyama et al. |
| 5,612,098 A |   | 3/1997 | Tan et al. |
| 5,768,066 A |   | 6/1998 | Akiyama et al. |
| 5,828,525 A |   | 10/1998 | Iwasaki et al. |
| 5,859,754 A |   | 1/1999 | Tong et al. |
| 6,046,892 A | * | 4/2000 | Aoshima et al. ....... 360/324.11 |
| 6,055,136 A | * | 4/2000 | Gill et al. ................... 360/314 |
| 6,208,491 B1 | * | 3/2001 | Pinarbasi ................. 360/324.1 |
| 2002/0067577 A1 | * | 6/2002 | Beach et al. ................. 360/314 |

* cited by examiner

Primary Examiner—A. J. Heinz
Assistant Examiner—Mark Blouin
(74) Attorney, Agent, or Firm—William D. Gill (57) ABSTRACT

A dual/differential spin valve (SV) sensor is provided with a single antiferromagnetic (AFM) layer sandwiched bewteen a first spin valve (SV) structure with an antiparallel (AP)-pinned layer and a second SV structure with a simple pinned layer. Having an AP-pinned layer for the first SV structure and a simple pinned layer for the second SV structure leads to a 180° phase difference in the response of the two SV structures. By arranging the bit transition length to be equal to the spacing between the free layers of the two SV structures, the signals generated by the two SV sensors are additive for both longitudinal and perpendicular recording applications.

6 Claims, 7 Drawing Sheets

DUAL/DIFFERENTIAL GMR HEAD WITH A SINGLE AFM LAYER

BACKGROUND OF THE INVENTION

1. Field of the Invention

This invention relates in general to spin valve magnetoresistive sensors for reading information signals from a magnetic medium and, in particular, to a dual/differential spin valve sensor with a single AFM layer.

2. Description of the Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., Ni—Fe) separated by a layer of non-magnetic material (e.g., copper) are generally referred to as spin valve (SV) sensors manifesting the SV effect.

Figure 1:
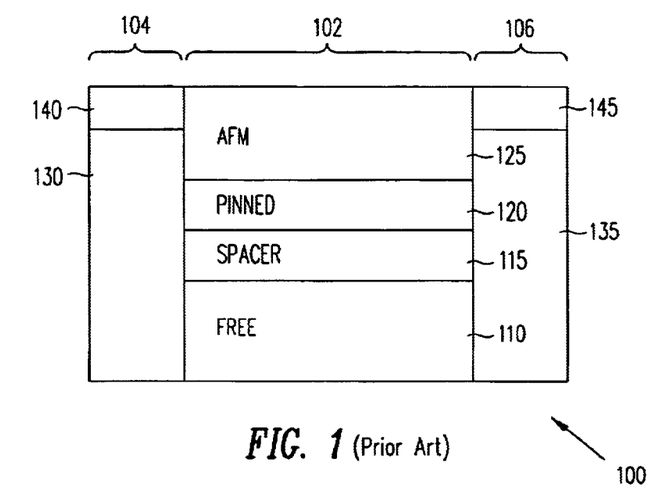
FIG. 1 is an air bearing surface view, not to scale, of a prior art SV sensor.

FIG. 1 shows a prior art SV sensor 100 comprising end regions 104 and 106 separated by a central region 102. A first ferromagnetic layer, referred to as a pinned layer 120, has its magnetization typically fixed (pinned) by exchange coupling with an antiferromagnetic (AFM) layer 125. The magnetization of a second ferromagnetic layer, referred to as a free layer 110, is not fixed and is free to rotate in response to the magnetic field from the recorded magnetic medium (the signal field). The free layer 110 is separated from the pinned layer 120 by a nonmagnetic, electrically conducting spacer layer 115. Hard bias layers 130 and 135 formed in the end regions 104 and 106, respectively, provide longitudinal bias for the free layer 110. Leads 140 and 145 formed on hard bias layers 130 and 135, respectively, provide electrical connections for sensing the resistance of SV sensor 100. IBM's U.S. Pat. No. 5,206,590 granted to Dieny et al., incorporated herein by reference, discloses a GMR sensor operating on the basis of the SV effect.

Another type of spin valve sensor is an antiparallel (AP) spin valve sensor. The AP-pinned valve sensor differs from the simple simple spin valve sensor in that an AP-pinned structure has multiple thin film layers instead of a single pinned layer. The AP-pinned structure has an antiparallel coupling (APC) layer sandwiched between first and second ferromagnetic pinned layers. The first pinned layer has its magnetization oriented in a first direction by exchange coupling to the antiferromagnetic pinning layer. The second pinned layer is immediately adjacent to the free layer and is antiparallel exchange coupled to the first pinned layer because of the minimal thickness (in the order of 8 Å) of the APC layer between the first and second pinned layers. Accordingly, the magnetization of the second pinned layer is oriented in a second direction that is antiparallel to the direction of the magnetization of the first pinned layer.

The AP-pinned structure is preferred over the single pinned layer because the magnetizations of the first and second pinned layers of the AP-inned structure subtractively combine to provide a net magnetization that is less than the magnetization of the single pinned layer. The direction of the net magnetization is determined by the thicker of the first and second pinned layers. A reduced net magnetization equates to a reduced demagnetization field from the AP-pinned structure. Since the antiferromagnetic exchange coupling is inversely proportional to the net pinning magnetization, this increases exchange coupling between the first pinned layer and the antiferromagnetic pinning layer. The AP-pinned spin valve sensor is described in commonly assigned U.S. Pat. No. 5,465,185 to Heim and Parkin which is incorporated by reference herein.

There is a continuing need to increase the MR coefficient and reduce the thickness of GMR sensors. An increase in the spin valve effect and reduced sensor geometry equates to higher bit density (bits/square inch of the rotating magnetic disk) read by the read head.

SUMMARY OF THE INVENTION

It is an object of the present invention to disclose a dual/differential spin valve sensor having a single AFM layer providing pinning of both a first AP-pinned layer structure and a second simple pinned layer of first and second spin valve structures, respectively.

It is another object of the present invention to disclose a dual/differential spin valve sensor with first and second spin valve structures having oppositely oriented pinned layer magnetization directions.

It is yet another object of the present invention to disclose a dual/differential spin valve sensor with first and second spin valve structures having first and second free layers separated by a distance equal to half the bit length of magnetic data recorded on a magnetic recording media.

It is a further object of the present invention to disclose a dual/differential spin valve sensor having first and second free layers biased to provide 90° relative orientation difference of their magnetizations at the quiescent bias point (i.e. with no signal field present).

In accordance with the principles of the present invention, there is disclosed a dual/differential spin valve sensor comprising a first spin valve structure, a second spin valve stucture and a single antiferromagnetic (AFM) layer disposed between the first and second spin valve structures. The first spin valve structure comprises a first ferromagnetic layer (FM1), an AP-pinned layer structure having second and third ferromagnetic layers (FM2 and FM3) separated by an antiparallel coupling (APC) layer, and a conductive first spacer layer disposed between the first and second ferromagnetic layers. The second spin valve structure comprises fourth and fifth ferromagnetic layers (FM4 and FM5) separated by a conductive second spacer layer. The AFM layer is sandwiched between the third and fourth ferromagnetic layers and is exchange coupled to the third and fourth ferromagnetic layers providing an exchange field to pin the magnetization directions of the third and fourth ferromagnetic layers in one direction. Due to the antiferromagetic coupling of the APC layer, the magnetization direction of the second ferromagnetic layer is oriented antiparallel to the magnetization direction of the third ferromagnetic layer. Having an AP-pinned layer for the first spin valve structure and a simple pinned layer for the second spin valve structure leads to a 180° phase difference between the pinned second and fourth ferromagnetic layers. The first and fifth ferromagnetic layers are free to rotate in response to signal magnetic fields from magnetic data recorded on magnetic media.

The bit transition length of magnetic data recorded on the magnetic media is arranged to be equal to the spacing between the first and fifth ferromagnetic layers (the free layers) of the dual/differential sensor. With the bit transition length equal to the spacing between the first and fifth ferromagnetic layers, the signals generated by the first and second spin valves add due to the 180° phase difference of the pinning of the second and fourth ferromagnetic layers. The responses of the first and second spin valves are additive for both longitudinal and perpendicular recording applications as long as the bit transition length is made equal to the separation of the first and fifth ferromagnetic layers.

For optimal sensor performance, the ferromagnetic free layers, FM1 and FM5, should be biased to provide 90° relative orientation between the magnetizations of FM1 and and the pinned layer FM2, and similarly, between the magnetizations of FM5 and the pinned layer FM4 at the quiescent bias point (i.e. without any bit field present). This condition can be realized with the dual/differential spin valve sensor of the present invention because the ferromagnetic coupling fields ($H_F$) from the pinned layers FM2 and FM4 and the fields from the sense current ($H_I$) oppose each other at both free layers (FM1 and FM5) for the proper choice of sense current polarity. Demagnetization fields ($H_D$) from the pinned layers FM2, FM3 and FM4 are made to cancel at the free layers FM1 and FM5 by selecting the thicknesses of the pinned layers so that the net demagnetization field $H_{D3}$–$H_{D2}$ from the AP-pinned layers FM2 and FM3 cancels the demagnetization field $H_{D4}$ of the pinned layer FM4 at the free layers.

An advantage of a dual/differential spin valve sensor having a single AFM layer providing pinning for an AP-pinned layer of a first spin valve structure and for a simple pinned layer of a second spin valve structure is that setting a single AFM layer is simpler to fabricate than setting two different AFM materials to generate 180° out of phase pinned layers. In addition, the use of a single AFM layer for pinning both spin valve structures results in a significantly thinner dual/differential sensor which translates to a higher bit density read capability for the sensor.

Because of the differential operation of this sensor, stray magnetic fields do not generate any signal. Therefore, there is no need for ferromagnetic shields on either side of the dual/differential sensor of the present invention.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 2:
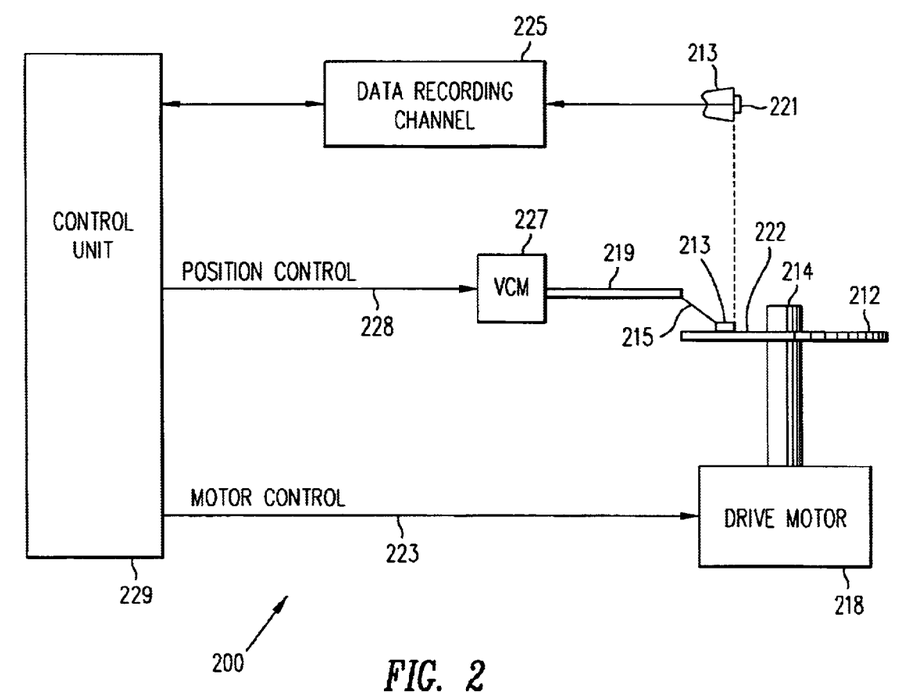
FIG. 2 is a simplified diagram of a magnetic recording disk drive system using the MTJ sensor of the present invention.

Referring now to FIG. 2, there is shown a disk drive 200 embodying the present invention. As shown in FIG. 2, at least one rotatable magnetic disk 212 is supported on a spindle 214 and rotated by a disk drive motor 218. The magnetic recording media on each disk is in the form of an annular pattern of concentric data tracks (not shown) on the disk 212.

At least one slider 213 is positioned on the disk 212, each slider 213 supporting one or more magnetic read/write heads 221 where the head 221 incorporates the SV sensor of the present invention. As the disks rotate, the slider 213 is moved radially in and out over the disk surface 222 so that the heads 221 may access different portions of the disk where desired data is recorded. Each slider 213 is attached to an actuator arm 219 by means of a suspension 215. The suspension 215 provides a slight spring force which biases the slider 213 against the disk surface 222. Each actuator arm 219 is attached to an actuator 227. The actuator as shown in FIG. 2 may be a voice coil motor (VCM). The VCM comprises a coil movable within a fixed magnetic field, the direction and speed of the coil movements being controlled by the motor current signals supplied by a controller 229.

During operation of the disk storage system, the rotation of the disk 212 generates an air bearing between the slider 213 (the surface of the slider 213 which includes the head 321 and faces the surface of the disk 212 is referred to as an air bearing surface (ABS)) and the disk surface 222 which exerts an upward force or lift on the slider. The air bearing thus counterbalances the slight spring force of the suspension 215 and supports the slider 213 off and slightly above the disk surface by a small, substantially constant spacing during normal operation.

The various components of the disk storage system are controlled in operation by control signals generated by the control unit 229, such as access control signals and internal clock signals. Typically, the control unit 229 comprises logic control circuits, storage chips and a microprocessor. The control unit 229 generates control signals to control various system operations such as drive motor control signals on line 223 and head position and seek control signals on line 228. The control signals on line 228 provide the desired current profiles to optimally move and position the slider 213 to the desired data track on the disk 212. Read and write signals are communicated to and from the read/write heads 221 by means of the recording channel 225. Recording channel 225 may be a partial response maximum likelihood (PMRL) channel or a peak detect channel. The design and implementation of both channels are well known in the art and to persons skilled in the art. In the preferred embodiment, recording channel 225 is a PMRL channel.

The above description of a typical magnetic disk storage system, and the accompanying illustration of FIG. 2 are for representation purposes only. It should be apparent that disk storage systems may contain a large number of disks and actuator arms, and each actuator arm may support a number of sliders.

Figure 3:
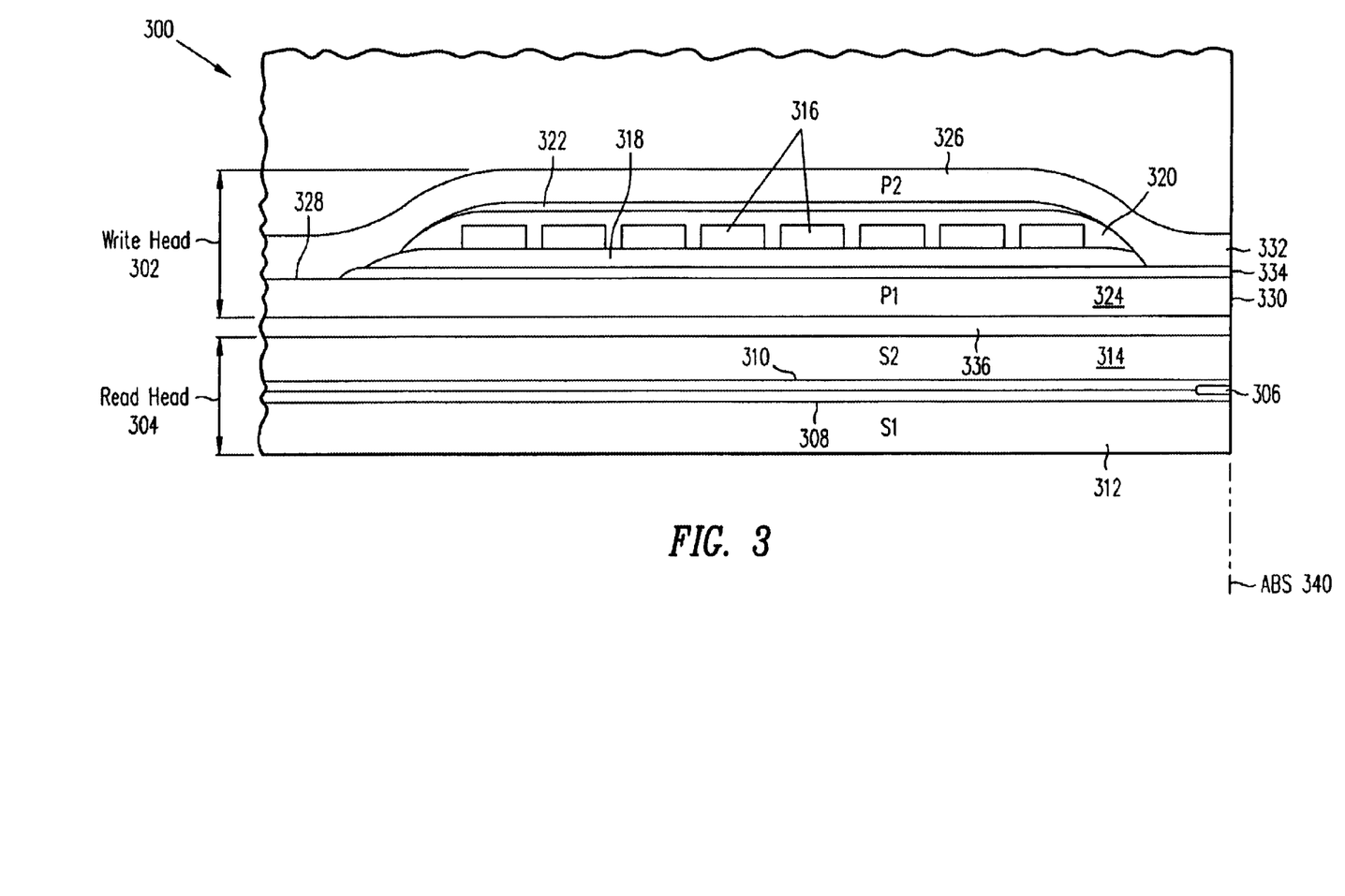
FIG. 3 is a vertical cross-section view, not to scale, of a "piggyback" read/write magnetic head.

FIG. 3 is a side cross-sectional elevation view of a "piggyback" magnetic read/write head 300, which includes a write head portion 302 and a read head portion 304, the read head portion employing a dual/differential spin valve sensor 306 according to the present invention. The sensor 306 is sandwiched between nonmagnetic insulative first and second read gap layers 308 and 310, and the read gap layers are sandwiched between ferromagnetic first and second shield layers 312 and 314. In response to external magnetic fields, the resistance of the sensor 306 changes. A sense current $I_s$ conducted through the sensor causes these resistance changes to be manifested as potential changes. These potential changes are then processed as readback signals by the processing circuitry of the data recording channel 246 shown in FIG. 2.

The write head portion 302 of the magnetic read/write head 300 includes a coil layer 316 sandwiched between first and second insulation layers 318 and 320. A third insulation layer 322 may be employed for planarizing the head to eliminate ripples in the second insulation layer 320 caused by the coil layer 316. The first, second and third insulation layers are referred to in the art as an insulation stack. The coil layer 316 and the first, second and third insulation layers 38, 320 and 322 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS 340. An insulation layer 336 is located between the second shield layer 314 and the first pole piece layer 324. Since the second shield layer 314 and the first pole piece layer 324 are separate layers this read/write head is known as a "piggyback" head.

Figure 4:
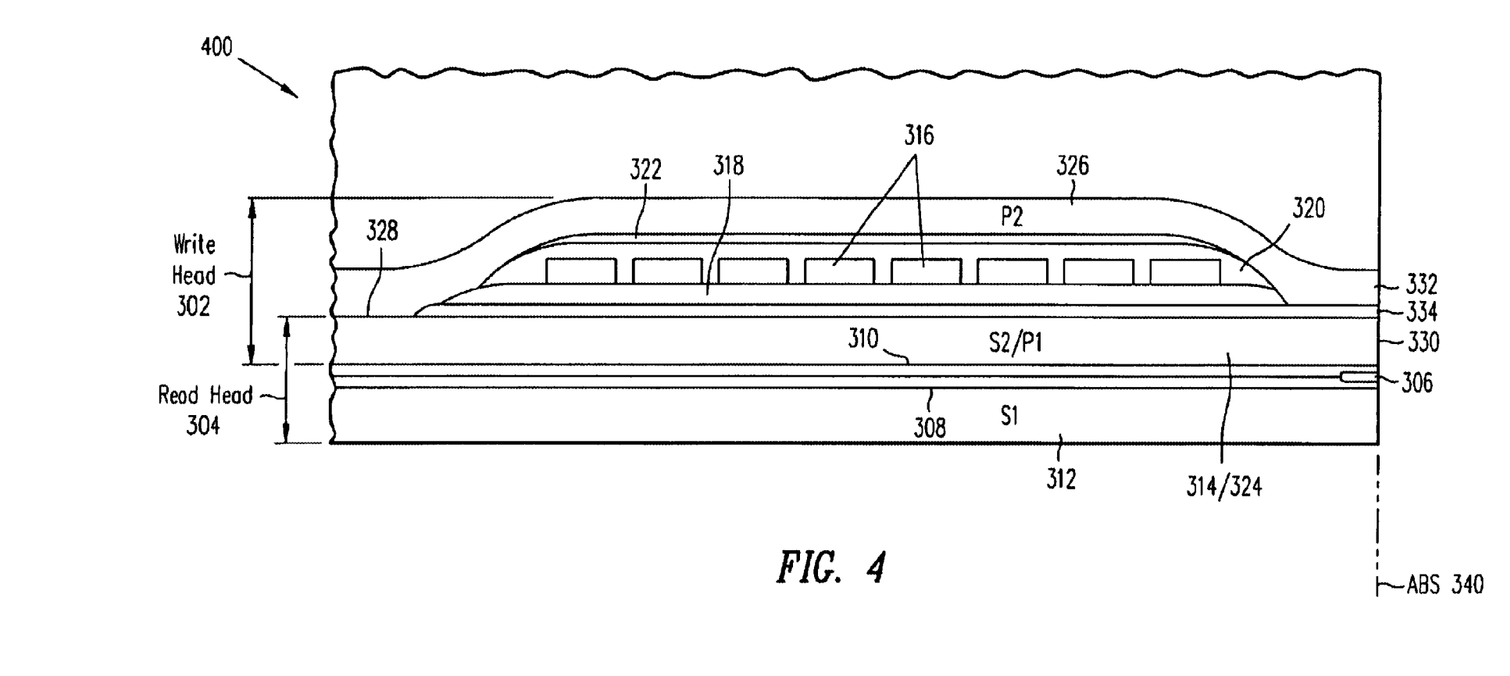
FIG. 4 is a vertical cross-section view, not to scale, of a "merged" read/write magnetic head.

FIG. 4 is the same as FIG. 3 except the second shield layer 414 and the first pole piece layer 424 are a common layer. This type of read/write head is known as a "merged" head 400. The insulation layer 336 of the piggyback head in FIG. 3 is omitted in the merged head 400 of FIG. 4.

Because of the differential operation of the dual/differential sensor of the present invention, stray magnetic fields do not generate any signal, and therefore, the first and second shield layers 312 and 314 may be omitted from the read/write head structures of FIGS. 3 and 4. If the ferromagnetic shield layers are omitted, there is no difference between the piggyback and merged head structures 300 and 400.

Figure 5:
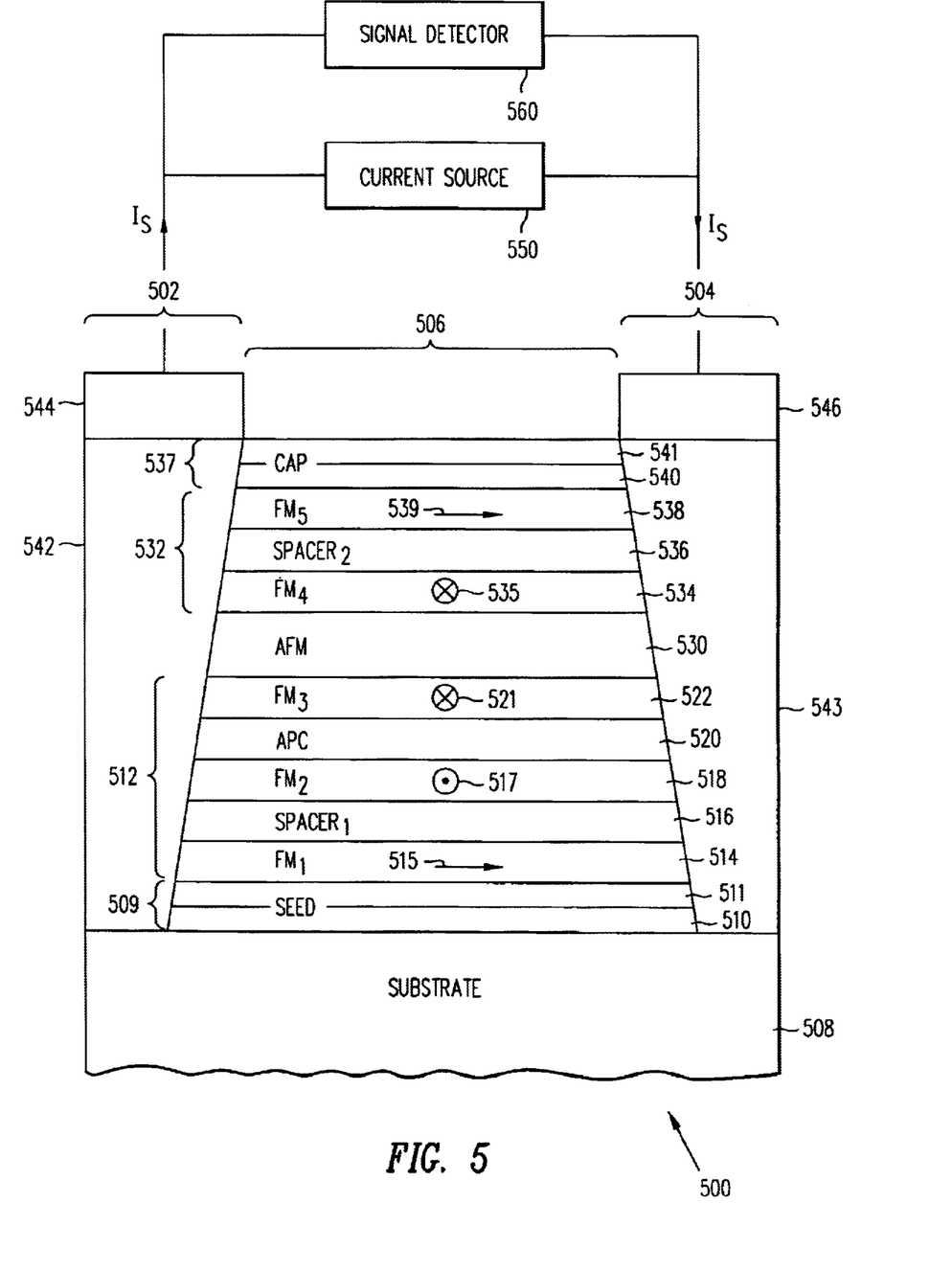
FIG. 5 is an air bearing surface view, not to scale, of an embodiment of the dual/differential spin valve sensor of the present invention.

FIG. 5 shows an air bearing surface (ABS) view, not to scale, of a dual/differential spin valve (SV) sensor 500 according to a preferred embodiment of the present invention. The SV sensor 500 comprises end regions 502 and 504 separated from each other by a central region 506. The substrate 508 can be any suitable substance, including glass, semiconductor material, or a ceramic material such as alumina ($Al_2O_3$). The seed layer 509 is a layer deposited to modify the crystallographic texture or grain size of the subsequent layers, and may not be needed depending on the subsequent layer. For the embodiment of the SV sensor 500, the seed layer 509 comprises a bilayer structure deposited on the substrate. First and second sublayers 510 and 511 are sequentially deposited on the substrate 508. A first spin valve structure 512 deposited over the seed layer 509 comprises a first ferromagnetic layer (FM1) 514, a conductive first spacer layer 516 and an AP-pinned layer structure having second and third ferromagnetic layers, (FM2) 518 and (FM3) 522, respectively, separated by an antiparallel coupling (APC) layer 520. The APC layer 520 is formed of a nonmagnetic material, preferably ruthenium (Ru) that allows the FM2 layer 518 and the FM3 layer 522 to be strongly coupled together antiferromagnetically. An antiferromagnetic (AFM) layer 530 is deposited over the AP-pinned layer structure to the thickness at which the desired exchange properties are achieved, typically 50–500 Å. A second spin valve structure 532 deposited over the AFM layer 530 comprises fourth and fifth ferromagnetic layers (FM4) 534 and (FM5) 538, respectively, separated by a conductive second spacer layer 536. A cap layer 537, formed on the FM5 layer 538, completes the central region 506 of the SV sensor 500.

In the present embodiment, the cap layer 537 is a bilayer cap layer formed of a first sublayer 540 of copper (Cu) formed on the FM5 layer 538 and a second sublayer 541 of tantalum (Ta) formed on the first sublayer of Cu. The presence of a Cu layer adjacent to the free layer is known to enhance the magnetoresistance of the SV sensor through a spin filter effect. Alternatively, the cap layer 537 may be formed of a single layer of Ta.

The AFM layer 530 is exchange coupled to the FM3 and FM4 layers 522 and 534, respectively, to provide a pinning magnetic field to pin the magnetizations of the AP-pinned layer structure and the FM4 layer perpendicular to the AFM as indicated by arrow head 517 and tails 521 and 535 pointing out of and into the plane of the paper, respectively. The FM1 layer 514 and the FM5 layer 538 are free ferromagnetic layers for the first and second spin valve structures 512 and 532, respectively, and are free to rotate in the presence of an external (signal) magnetic field. The magnetizations of the free layers FM1 514 and FM5 538 are preferably parallel to the ABS in the absence of an external field as indicated by arrows 515 and 539, respectively. Alternatively, the magnetizations of the free layers FM1 and FM5 may be antiparallel to the direction indicated by the arrows.

The SV sensor 500 further comprises bias layers 542 and 543 formed on the end regions 502 and 504, respectively, for providing a longitudinal bias field to the free layers FM1 514 and FMS 538 to ensure a single magnetic domain state in the free layers. Lead layers 544 and 546 are also deposited on the end regions 502 and 504, respectively, to provide electrical connections for the flow of a sensing current $I_s$ from a current source 550 to the SV sensor 500. A signal detector 560 which is electrically connected to leads 544 and 546 senses the change in resistance due to changes induced in the free layers FM1 514 and FM5 538 by the external magnetic field (e.g., field generated by a data bit stored on a disk). The external field acts to rotate the directions of magnetization of the free layers FM1 514 and FM5 538 relative to the direction of magnetization of the pinned layers FM2 518 and FM4 534 which are preferably pinned perpendicular to the ABS. The signal detector 560 preferably comprises a partial response maximum likelihood (PRML) recording channel for processing the signal detected by SV sensor 500. Alternatively, a peak detect channel or a maximum likelihood channel (e.g., 1,7 ML) may be used. The design and implementation of the aforementioned channels are known to those skilled in the art. The signal detector 560 also includes other supporting circuitries such as a preamplifier (electrically placed between the sensor and the channel) for conditioning the sensed resistance changes as is known to those skilled in the art.

The SV sensor 500 is fabricated in a magnetron sputtering or an ion beam sputtering system to sequentially deposit the multilayer structure shown in FIG. 5. The sputter deposition process is carried out in the presence of a longitudinal magnetic field of about 40 Oe. The seed layer 509 is formed on the substrate 508 by sequentially depositing the first sublayer 510 of tantalum (Ta) having a thickness of about 30 Å and the second sublayer 511 of copper (Cu) having a thickness of about 10 Å.

The first spin valve structure 512 is formed on the seed layer 509 by sequentially depositing the FM1 layer 514 of Ni—Fe, or alternatively of Co—Fe, having a thickness in the range of 10–40 Å, the conductive first spacer layer 516 of Cu having a thickness of about 20 Å, the FM2 layer 518 of Ni—Fe, or alternatively of Co—Fe, having a thickness in the range of 10–30 Å, the APC layer 520 of Ru having a thickness of about 8 Å, and the FM3 layer 522 of Ni—Fe, or alternatively of Co—Fe, having a thickness in the range of 10–30 Å. The AFM layer 530 of Pt—Mn, or alternatively Ni—Mn, Ir—Mn or Pt—Pd—Mn, having a thickness in the range of 50–200 Å is deposited over the FM3 layer 522.

The second spin valve structure 532 is formed on the AFM layer 530 by sequentially depositing the FM4 layer 534 of Ni—Fe, or alternatively of Co—Fe, having a thickness in the range of 10–30 Å, the second spacer layer 536 of Cu having a thickness of about 20 Å, and the FM5 layer 538 of Ni—Fe, or alternatively of Co—Fe, having a thickness in the range of 10–40 Å. The cap layer 537 is formed over the FM5 layer 538 by sequentially depositing the first sublayer 540 of Cu having a thickness of about 10 Å and the second sublayer 541 of Ta having a thickness of about 30 Å.

After the deposition of the central portion 506 is completed, the sensor is annealed in the presence of a magnetic field of about 800 Oe in the transverse direction to the ABS and is then cooled while still in the magnetic field to set the exchange coupling of the AFM layer 530 with the pinned layers FM3 522 and FM4 534 transverse to the ABS. The FM3 layer 522 and the FM4 layer 534 have surfaces which interface with surfaces of the AFM layer 530 so that the AFM layer pins the magnetic moments 521 and 535 (represented in FIG. 5 by tails of arrows 521 and 535 pointing into the plane of the paper) of the FM3 and FM4 layers in a direction perpendicular to and away from the ABS. The APC layer 520 is very thin (about 8 Å) which allows an antiferromagnetic exchange coupling between the FM3 layer 522 and the FM2 layer 518. Accordingly, the magnetization 517 (represented by the head of an arrow pointing out of the plane of the paper) of the FM2 layer is directed in an opposite direction to the magnetization 521 of the FM3 layer, namely perpendicular to and towards the ABS. Alternatively, the magnetizations 521 and 535 of the FM3 and FM4 layers may be set in an opposite direction (perpendicular and toward the ABS) so that the magnetizations 521 and 535 point out of the plane of the paper. The magnetization 517 of the FM2 layer 518 will then point into the plane of the paper due to the antiparallel coupling across the APC layer 520.

Figure 6:
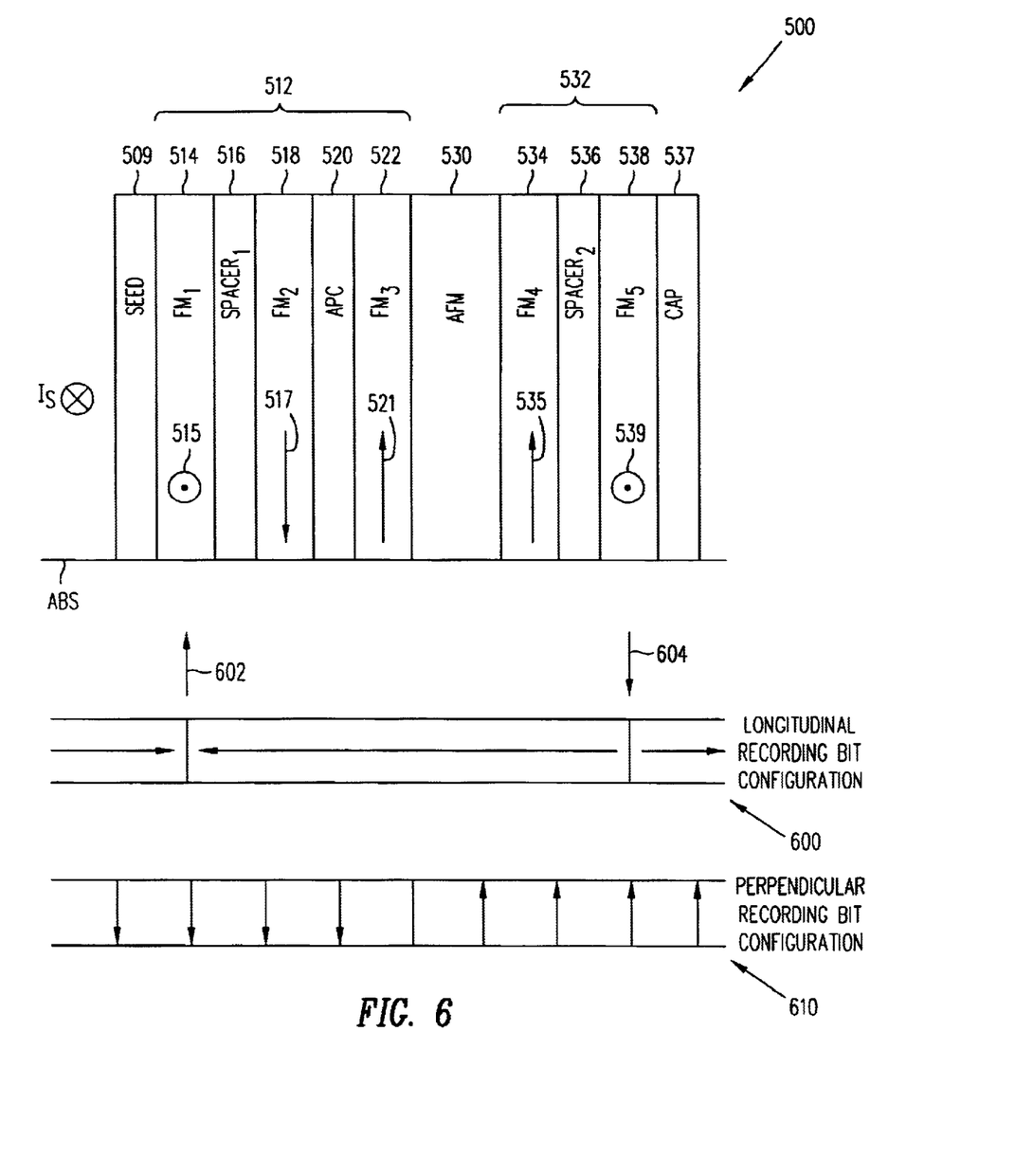
FIG. 6 is a side cross-section view, not to scale, of an embodiment of the dual differential spin valve sensor of the present invention.

FIG. 6 shows a side cross-section view, not to scale, of the the dual/differential spin valve sensor 500 of the present invention. The FM2 and FM3 layers 518 and 522 are AP-pinned while the FM4 layer 534 is simply pinned by the single AFM layer 530. This pinning difference leads to a phase difference of 180° between the pinned FM2 layer 518 and the pinned FM4 layer 534 due to the antiparallel orientation of the magnetizations 517 and 535, respectively. In the quiescent state (i.e., in the absence of a signal field from a recorded bit on the disk) the magnetizations 515 and 539 of the free layers FM1 514 and FM5 538 are oriented parallel and in the same direction. For longitudinal recording on a disk, the bit configuration 600 is arranged to have a bit transition length equal to the separation between the FM1 layer 514 and the FM5 layer 538. In the presence of the signal fields 602 and 604 from this bit configuration, the free layers FM1 and FM5 rotate in opposite directions resulting in additive signals from the first and second spin valve structures 512 and 532 due to the antiparallel orientations of their pinned layers FM2 and FM4, respectively. Similarly, in the case of perpendicular recording, the bit configuration 610 may be arranged to have a bit transition length equal to the spacing between the FM1 and FM5 layers resulting in opposite first and second magnetic signal field polarities under the FM1 and FM5 layers, respectively, and therefore additive signals from the first and second spin valve structures 512 and 532.

For optimal sensor performance, the free layers FM1 514 and FM5 538 should be biased to provide a 90° relative orientation between the magnetizations 515 and 517 of the free layer FM1 514 and pinned layer FM2 518, respectively, as well as a 90° relative orientation between the magnetizations 539 and 535 of the free layer FM5 538 and the pinned layer FM4 534, respectively, at the quiescent bias point (i.e., without any signal field present). This bias condition can be obtained because ferromagnetic coupling fields $H_{FC}$ and sense current induced fields $H_{SC}$ oppose each other at both free layers.

Figure 7:
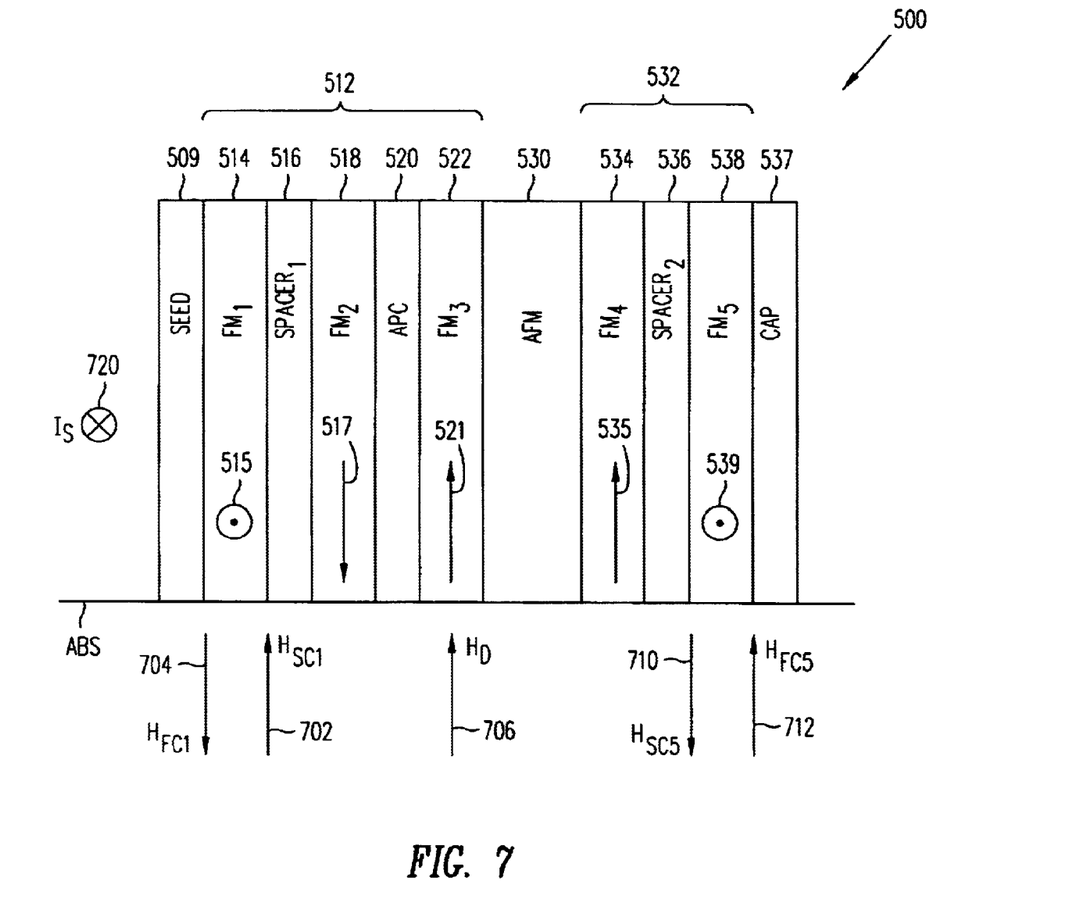
FIG. 7 is a side cross-section view, not to scale, of an embodiment of the dual/differential spin valve sensor of the present invention showing the influences on the biasing of the magnetizations of the free layers.

Various influences on the free layers FM1 and FM5 and consequently various influences on the biasing of the magnetizations 515 and 539 are shown in FIG. 7. The influences on the magnetization 515 of the FM1 layer 514 are $H_{FC1}$ 704, $H_D$ 706, and $H_{SC1}$ 702. The influences on the magnetization 539 of the FM5 layer 538 are $H_{FC5}$ 712, $H_D$ 706 and $H_{SC5}$ 710. $H_{FC1}$ is due to ferromagnetic coupling between the FM1 layer 514 and the FM2 layer 518, $H_D$ is the demagnetization field due to the net magnetization of the FM2, FM3 and FM4 layers 518, 522 and 538, $H_{SC1}$ is due to the sense current $I_S$ induced magnetic field at the FM1 layer 514, $H_{FC5}$ is due to ferromagnetic coupling between the FM5 layer 538 and the FM4 layer 534, and $H_{SC5}$ is due to the sense current $I_S$ induced magnetic field at the FM5 layer 538.

To achieve the desired biasing condition of a 90° relative orientation between the magnetizations of the free layers and the pinned layers under quiescent conditions, the net influence of $H_{FC}$, $H_D$ and $H_{SC}$ should be zero at the free layers. The net demagnetization field HD 706 is arranged to be zero, or nearly zero, by selecting the thicknesses of pinned layers FM2, FM3 and FM4. Since the FM2 and FM3 layers form an AP-pinned layer, the magnetic thicknesses of FM2 and FM3 are chosen so that the net magnetization of the AP pinned layer cancels the magnetization of the FM4 pinned layer. For FM1, FM2 and FM3 layers all made of the same ferromagnetic material, for example Ni—Fe or Co—Fe, this cancellation condition is achieved when the thickness of the FM2 layer is greater than the thickness of the FM3 layer and the thickness of the FM4 layer equals, or nearly equals, the difference in the thicknesses of the FM2 and FM3 layers. Therefore, when HD is equal to or nearly zero at the free layers, the desired bias condition is obtained by choosing the direction and magnitude of the sense current $I_S$ so that $H_{SC1}$ 702 cancels the ferromagnetic coupling field $H_{FC1}$ 704 at the FM1 layer 514 and $H_{SC5}$ 710 cancels the ferromagnetic coupling field $H_{FC5}$ 712 at the FM5 layer 538. For the orientations of the pinned layer magnetizations shown in FIG. 7, the current direction is chosen to flow in the direction perpendicular to and into the plane of the paper as indicated by the tail of the arrow 720. The current induced field $H_{SC1}$ 704 is the field due to the sense current flowing in all the layers to the right of the FM1 layer 514 and the current induced field $H_{SC5}$ 710 is the field due to the sense current flowing in all the layers to the left of the FM5 layer 538.

It will be apparent to those skilled in the art that in the above discussion with respect to FIGS. 5 and 7, the AFM layer 530 alternatively may be set in an opposite direction to pin the direction of the magnetizations 521 and 535 of the FM3 and FM4 layers 522 and 534, respectively, in an opposite direction, that is, directed toward the ABS. In this case, the magnetization 517 of the FM2 layer will be directed away from the ABS, $H_{FC1}$ 704 will be directed away from the ABS, and $H_{FC5}$ 712 will be directed toward the ABS. The demagnetization fields due to the magnetizations of the FM2, FM3 and FM4 layers 518, 522 and 538 will also be reversed, however the net demagnetization field $H_D$ 706 will again be zero or near zero. The direction of flow of the sense current $I_S$ is reversed to be out of the plane of the paper so that $H_{SC1}$ 702 and $H_{SC5}$ 710 are opposite in direction to $H_{FC1}$ 704 and $H_{FC5}$ 712, respectively, to cancel the effects of the ferromagnetic coupling fields at the free layers FM1 and FM5.

Figure 8:
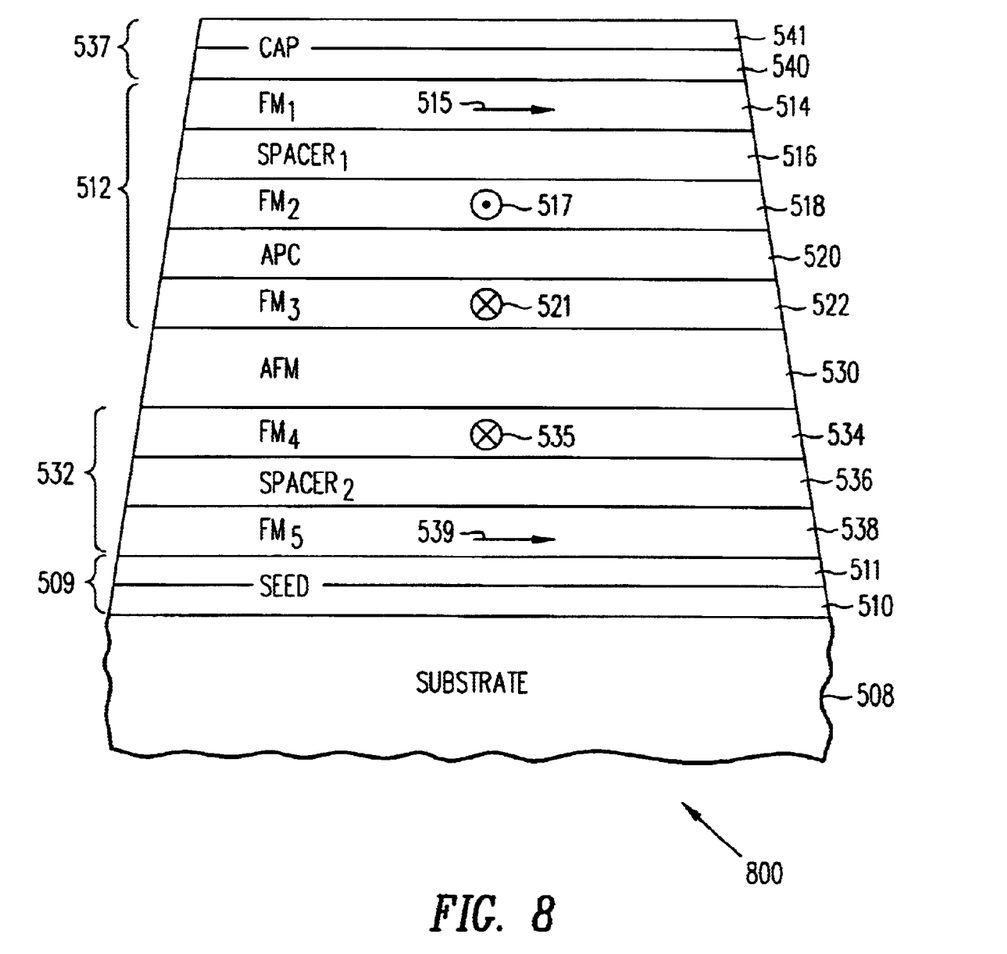
FIG. 8 is an air bearing surface view, not to scale, of another embodiment of the dual/differential spin valve sensor of the present invention.

FIG. 8 shows an air bearing surface (ABS) view, not to scale, of a dual/differential spin valve (SV) sensor 500 according to another embodiment of the present invention. The SV sensor 800 differs from the SV sensor 500 shown in FIG. 5 in having an inverted structure in which the layers of the SV sensor are deposited in reverse order to those forming SV sensor 500. The SV sensor 800 is formed by sequentially depositing the FM5 layer 538, the second spacer layer 536 and the FM4 layer 534 over the seed layer 509 to form the second SV structure 532. The AFM layer 530 is deposited over the FM4 layer and the FM3 layer 522, the APC layer 520, the FM2 layer 518, the first spacer layer 516 and the FM1 layer 514 are sequentially deposited over the AFM layer to form the first SV structure 512. The cap layer 537 comprising the first sublayer 540 and the second sublayer 541 are sequentially deposited over the FM5 layer to complete the central portion 806 of the SV sensor 800. The inverted SV sensor 800 is analogous in all other respects to the SV sensor 500 previously described.

While the present invention has been particularly shown and described with reference to the preferred embodiments, it will be understood to those skilled in the art that various changes in form and detail may be made without departing from the spirit, scope and teaching of the invention. Accordingly, the disclosed invention is to be considered merely as illustrative and limited only as specified in the appended claims.

I claim:

1. A dual/differential spin valve (SV) sensor, comprising:
   a first spin valve (SV) structure, comprising:
      a first ferromagnetic (FM1) layer;
      an antiparallel (AP)-pinned layer, including:
         a second ferromagnetic (FM2) layer;
         a third ferromagnetic (FM3) layer;
         an antiparallel coupling (APC) layer disposed between said FM2 and FM3 layers; and
      a conductive first spacer layer disposed between said FM1 and FM2 layers;
   a second spin valve (SV) structure, comprising:
      a fourth ferromagnetic (FM4) layer;
      a fifth ferromagnetic (FM5) layer; and
      a conductive second spacer layer disposed between said FM4 and FM5 layers; and
   an antiferromagnetic (AFM) layer disposed between said FM3 and FM4 layers; and
   wherein the thickness of the FM2 layer is greater than the thickness of the FM3 layer and the thickness of the FM4 layer is equal or nearly equal to the difference in the thicknesses of the FM2 and FM3 layers.

2. A dual differential spin valve (SV) sensor, comprising:
   a first spin valve (SV) structure means for detecting a first magnetic signal field, said first SV structure means including an antiparallel (AP)-pinned layer;
   a second spin valve (SV) structure means for detecting a second magnetic signal field, said second magnetic signal field having a direction opposite to said first magnetic signal field, said second SV structure means including a simple pinned layer; and
   an antiferromagnetic (AFM) layer means disposed between said first and second SV structure means, said AFM layer means for providing a pinning magnetic field to pin a magnetization of said AP-pinned layer and a magnetization of said simple pinned layer.

3. A magnetic read/write head comprising:
   a write head including:
      at least one coil layer and an insulation stack, the coil layer being embedded in the insulation stack;
      first and second pole piece layers connected at a back gap and having pole tips with edges forming a portion of an air bearing surface (ABS);
      the insulation stack being sandwiched between the first and second pole piece layers; and
      a write gap layer sandwiched between the pole tips of the first and second pole piece layers and forming a portion of the ABS;
   a read head including:
      a dual/differential spin valve (SV) sensor, the SV sensor being sandwiched between first and second read gap layers, the SV sensor comprising:
         a first spin valve (SV) structure, comprising:
            a first ferromagnetic (FM1) layer;

an antiparallel (AP)-pinned layer, including:
  a second ferromagnetic (FM2) layer;
  a third ferromagnetic (FM3) layer;
  an antiparallel coupling (APC) layer disposed between said FM2 and FM3 layers; and
  a conductive first spacer layer disposed between said FM1 and FM2 layers;
a second spin valve (SV) structure, comprising:
  a fourth ferromagnetic (FM4) layer;
  a fifth ferromagnetic (FM5) layer; and
  a conductive second spacer layer disposed between said FM4 and FM5 layers; and
an antiferromagnetic (AFM) layer disposed between said FM3 and FM4 layers; and
wherein the thickness of the FM2 layer is greater than the thickness of the FM3 layer and the thickness of the FM4 layer is equal or nearly equal to the difference in the thicknesses of the FM2 and FM3 layers; and
an insulation layer disposed between the second read gap layer of the read head and the first pole piece layer of the write head.

4. A magnetic read/write head comprising:
a write head including:
  at least one coil layer and an insulation stack, the coil layer being embedded in the insulation stack;
  first and second pole piece layers connected at a back gap and having pole tips with edges forming a portion of an air bearing surface (ABS);
  the insulation stack being sandwiched between the first and second pole piece layers; and
  a write gap layer sandwiched between the pole tips of the first and second pole piece layers and forming a portion of the ABS;
a read head including:
  a dual/differential spin valve (SV) sensor, the SV sensor being sandwiched between first and second read gap layers, the SV sensor comprising:
    a first spin valve (SV) structure means for detecting a first magnetic signal field, said first SV structure means including an antiparallel (AP)-pinned layer;
    a second spin valve (SV) structure means for detecting a second magnetic signal field, said second magnetic signal field having a direction opposite to said first magnetic signal field, said second SV structure means including a simple pinned layer; and
    an antiferromagnetic (AFM) layer means disposed between said first and second SV structure means, said AFM layer means for providing a pinning magnetic field to pin a magnetization of said AP-pinned layer and a magnetization of said simple pinned layer; and
an insulation layer disposed between the second read gap layer of the read head and the first pole piece layer of the write head.

5. A disk drive system comprising:
a magnetic recording disk;
a magnetic read/write head for magnetically recording data on the magnetic recording disk and for sensing magnetically recorded data on the magnetic recording disk, said magnetic read/write head comprising:
a write head including:
  at least one coil layer and an insulation stack, the coil layer being embedded in the insulation stack;
  first and second pole piece layers connected at a back gap and having pole tips with edges forming a portion of an air bearing surface (ABS);
  the insulation stack being sandwiched between the first and second pole piece layers; and
  a write gap layer sandwiched between the pole tips of the first and second pole piece layers and forming a portion of the ABS;
a read head including:
  a dual/differential spin valve (SV) sensor, the SV sensor being sandwiched between first and second read gap layers, the SV sensor comprising:
    a first spin valve (SV) structure, comprising:
      a first ferromagnetic (FM1) layer;
      an antiparallel (AP)-pinned layer, including:
        a second ferromagnetic (FM2) layer;
        a third ferromagnetic (FM3) layer;
        an antiparallel coupling (APC) layer disposed between said FM2 and FM3 layers; and
      a conductive first spacer layer disposed between said FM1 and FM2 layers;
    a second spin valve (SV) structure, comprising:
      a fourth ferromagnetic (FM4) layer;
      a fifth ferromagnetic (FM5) layer; and
      a conductive second spacer layer disposed between said FM4 and FM5 layers; and
    an antiferromagnetic (AW) layer disposed between said FM3 and FM4 layers; and
    wherein the thickness of the FM2 layer is greater than the thickness of the FM3 layer and the thickness of the FM4 layer is equal or nearly equal to the difference in the thicknesses of the FM2 and FM3 layers; and
    an insulation layer disposed between the second read gap layer of the read head and the first pole piece layer of the write head; and
an actuator for moving said magnetic read/write head across the magnetic disk so that the read/write head may access different regions of the magnetic recording disk; and
a recording channel coupled electrically to the write head for magnetically recording data on the magnetic recording disk and to the SV sensor of the read head for detecting changes in resistance of the SV sensor caused by rotation of the magnetizations of the FM1 and FM5 layers relative to the fixed magnetizations of the FM2 and FM4 layers, respectively, in response to magnetic fields from the magnetically recorded data.

6. A disk drive system comprising:
a magnetic recording disk;
a magnetic read/write head for magnetically recording data on the magnetic recording disk and for sensing magnetically recorded data on the magnetic recording disk, said magnetic read/write head comprising:
a write head including:
  at least one coil layer and an insulation stack, the coil layer being embedded in the insulation stack;
  first and second pole piece layers connected at a back gap and having pole tips with edges forming a portion of an air bearing surface (ABS);
  the insulation stack being sandwiched between the first and second pole piece layers; and
  a write gap layer sandwiched between the pole tips of the first and second pole piece layers and forming a portion of the ABS;
a read head including:
  a dual/differential spin valve (SV) sensor, the SV sensor being sandwiched between first and second read gap layers, the SV sensor comprising:
    a first spin valve (SV) structure means for detecting a first magnetic signal field, said first SV structure means including an antiparallel (AP)-pinned layer;

a second spin valve (SV) structure means for detecting a second magnetic signal field, said second magnetic signal field having a direction opposite to said first magnetic signal field, said second SV structure means including a simple pinned layer; and an antiferromagnetic (AFM) layer means disposed between said first and second SV structure means, said AFM layer means for providing a pinning magnetic field to pin a magnetization of said AP-pinned layer and a magnetization of said simple pinned layer; and an insulation layer disposed between the second read gap layer of the read head and the first pole piece layer of the write head; and an actuator for moving said magnetic read/write head across the magnetic disk so that the read/write head may access different regions of the magnetic recording disk; and a recording channel coupled electrically to the write head for magnetically recording data on the magnetic recording disk and to the SV sensor of the read head for detecting changes in resistance of the SV sensor in response to said first and second magnetic fields from the magnetically recorded data.

* * * * *